United States Patent
Tanno

(10) Patent No.: US 7,500,499 B2
(45) Date of Patent: Mar. 10, 2009

(54) TIRE WHEEL ASSEMBLY AND NOISE-REDUCING DEVICE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 164 days.

(21) Appl. No.: 10/567,380

(22) PCT Filed: Jun. 22, 2004

(86) PCT No.: PCT/JP2004/008735

§ 371 (c)(1),
(2), (4) Date: Feb. 7, 2006

(87) PCT Pub. No.: WO2005/018958

PCT Pub. Date: Mar. 3, 2005

(65) Prior Publication Data

US 2006/0254685 A1    Nov. 16, 2006

(30) Foreign Application Priority Data

Aug. 22, 2003   (JP)   ............... 2003-298980

(51) Int. Cl.
*B60C 19/00*   (2006.01)
*B60C 17/00*   (2006.01)
*B60C 17/04*   (2006.01)
*B60C 5/00*    (2006.01)

(52) U.S. Cl. ............... 152/155; 152/156; 152/196; 152/450; 152/516; 152/520

(58) Field of Classification Search ............... 152/154.2, 152/155, 157, 158, 196, 197, 516, 520, 450
See application file for complete search history.

(56) References Cited

U.S. PATENT DOCUMENTS

| 4,676,288 | A * | 6/1987 | Zinnen | 152/158 |
| 6,343,635 | B1 * | 2/2002 | Hsu | 152/153 |
| 2002/0195183 | A1 * | 12/2002 | Glinz et al. | 152/400 |

FOREIGN PATENT DOCUMENTS

| JP | 64-18708 | * | 1/1989 |
| JP | 07-017222 | | 1/1995 |
| JP | 10-297226 A1 | | 11/1998 |
| JP | 2001-113902 A | | 4/2001 |
| JP | 2002-096614 | | 4/2002 |
| JP | 2002-166712 | | 6/2002 |
| JP | 2002-234304 A | | 8/2002 |
| JP | 2003-048407 | | 2/2003 |

* cited by examiner

*Primary Examiner*—Justin Fischer
(74) *Attorney, Agent, or Firm*—Greer, Burns & Crain, Ltd.

(57) ABSTRACT

Disclosed are a tire wheel assembly and a noise-reducing device whereby cavity resonance sound can be effectively reduced. A noise-reducing device, which includes a shell structure where a rough surface portion having a ten-point height of irregularities (Rz) in a range of 0.1 to 5.0 mm is provided on at least part of a surface, is attached to a wheel rim in a cavity portion of a pneumatic tire, and additionally, a height of the shell structure from a rim sheet is set in a range of 10 to 70% of a cross-sectional height of the tire.

15 Claims, 4 Drawing Sheets

US 7,500,499 B2

TIRE WHEEL ASSEMBLY AND NOISE-REDUCING DEVICE

TECHNICAL FIELD

The present invention relates to a tire wheel assembly and a noise-reducing device, and more specifically, relates to a tire wheel assembly and a noise-reducing device whereby cavity resonance sound can be effectively reduced.

BACKGROUND ART

In the past, it has been known that cavity resonance in a closed space formed by a pneumatic tire and a wheel rim worsens noise (refer to Patent Document 1, for example). In response to this, in recent years, for the purpose of achieving noise reduction of a pneumatic tire, it has been desired that cavity resonance sound be effectively reduced.

[Patent Document 1] Japanese patent application *Kokai* publication No.2001-113902

DISCLOSURE OF THE INVENTION

An object of the present invention is to provide a tire wheel assembly and a noise-reducing device whereby cavity resonance sound can be effectively reduced.

A tire wheel assembly of the present invention for achieving the above object is characterized in that: a noise-reducing device is attached to a wheel rim in a cavity portion of a pneumatic tire, the noise-reducing device including a shell structure where a rough surface portion having a ten-point height of irregularities (Rz) in a range of 0.1 to 5.0 mm is provided on at least part of a surface; and a height of the shell structure from a rim sheet is set in a range of 10 to 70% of a cross sectional height of the tire.

A noise-reducing device of the present invention is a noise-reducing device intended to be attached to rim wheel in a cavity portion of a pneumatic tire, which is characterized in that: it includes a shell structure where a rough surface portion having a ten-point height of irregularities (Rz) in a range of 0.1 to 5.0 mm is provided in at least part of a surface; and a height of the shell structure from a rim sheet is set in a range of 10 to 70% of a cross sectional height of the tire.

The inventor of the present invention has reached the present invention by having found out that, by arranging a shell structure provided with a rough surface portion having roughness of an appropriate level in a cavity portion of pneumatic tire, cavity resonance noise is effectively reduced based on a sound absorption effect through irregularities of the rough surface portion.

In other words, in the present invention, cavity resonance sound can be effectively reduced in a manner that: a noise-reducing device including a shell structure, where a rough surface portion having a ten-point height of irregularities (Rz) in a range of 0.1 to 5.0 mm is provided on at least part of a surface, is configured, and while this noise-reducing device is attached to a rim wheel in a cavity portion of a pneumatic tire, a height of the shell structure from a rim sheet is set in a range of 10 to 70% of a cross-sectional height of the tire. Furthermore, the above noise-reducing device does not necessitate any processing onto a tire or a wheel, whereby it is applicable to any tire wheel assembly and hence is excellent in compatibility.

In the present invention, the shell structure can be configured in any one of the following manners: that it is supported on a rim through a pair of elastic rings; and that it is formed of an annular tube. In any one of the above cases, it is preferable that a wall thickness of the shell structure be in a range of 0.4 to 1.0 mm. Thereby, it becomes possible to configure the noise-reducing device which is easy to be attached to a rim and is light in weight.

An area of the rough surface portion may be at least 20% of the entire surface area of the shell structure, and in particular, it is preferable that the area of the rough surface portion be at least 40% of the entire surface area of the shell structure. Additionally, it is preferable that the ten-point height of irregularities (Rz) of the rough surface portion be in a range of 0.1 to 3.0 mm. With these preferable conditions, a reduction effect on cavity resonance sound is further improved.

While it is possible to form the rough surface portion by way of a physical treatment or a chemical treatment, it is possible to take another method whereby it is formed by fixing particles on a surface of the shell structure. For example, in a case where hollow particles each formed of an elastic body are fixed on the surface of the shell structure, a reduction effect on cavity resonance sound is improved. A diameter of each of the particles may be in a range of 0.1 to 3.0 mm.

Note that the ten-point height of irregularities (Rz) complies with JIS B0601 (2001), and that a standard length thereof is set to 50 mm.

BEST MODES FOR CARRYING OUT THE INVENTION

Hereinbelow, detailed descriptions will be given of configurations of the present invention with reference to the attached drawings.

Figure 1:
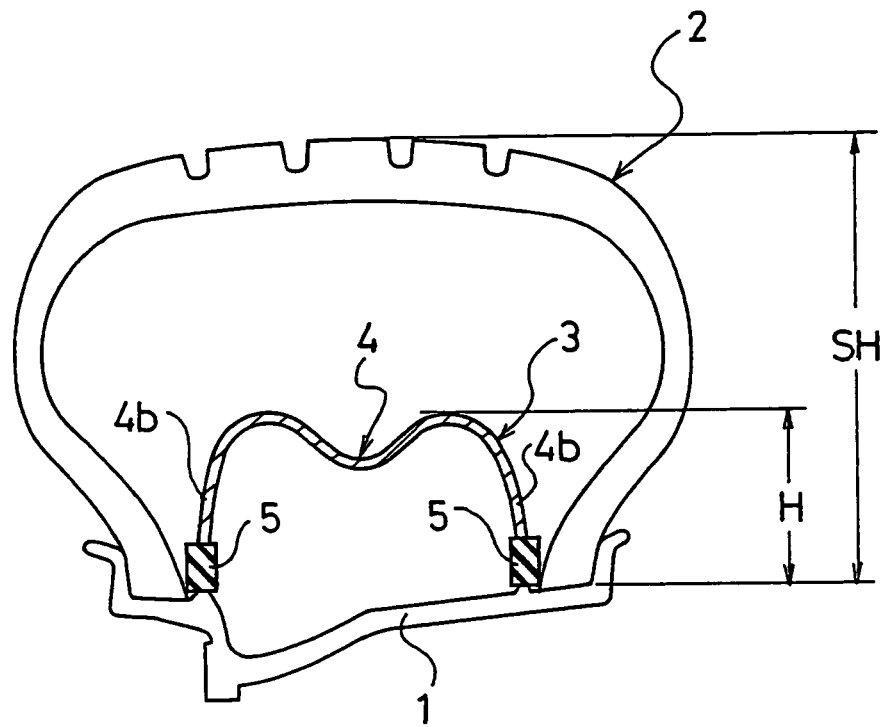
FIG. 1 is a cross-sectional view taken along a meridian of the tire, showing a main portion of a tire wheel assembly configured of a first embodiment of the present invention.

FIG. 1 shows a main portion of a tire wheel assembly (a tired wheel) configured of a first embodiment of the present invention, and therein, reference numerals 1, 2, and 3 denote a wheel rim, a pneumatic tire, and a noise-reducing device, respectively. These wheel rim 1, pneumatic tire 2 and noise-reducing device 3 are formed respectively in ring shapes whose common center is an unillustrated rotational axis of the wheel. The noise-reducing device 3 is composed of a shell structure 4 and a pair of elastic rings 5, 5, and is attached to the rim 1 in a cavity portion of the pneumatic tire 2.

The shell structure 4 is composed of a plate material having a thickness in a range of 0.4 to 1.0 mm, and has an arch-like cross-sectional shape where a pair of salient portions are extruded outside the tire in a radial direction of the tire. If this thickness is less than 0.4 mm, stability of the shape becomes insufficient, and to the contrary, if this thickness exceeds 1.0 mm, a weight thereof becomes excessively large. Additionally, a height H of the shell structure 4 from a rim sheet is set in a range of 10 to 70% of a cross-sectional height SH of the tire. If this height H is less than 10% of the cross-sectional height SH of the tire, a noise reduction effect becomes insufficient, and to the contrary, if this height H exceeds 70% of the cross-sectional height SH of the tire, there is a possibility that the shell structure 4 comes into contact with an inner surface of the tire when the tire is run. In particular, it is preferable that the height H be in a range of 30 to 50% of the cross-sectional height SH of the tire.

As a material constituting the shell structure 4, a metal, a resin or the like can be used. As the metal, steel, aluminum and the like can be cited. On the other hand, as the resin, any one of a thermoplastic resin and a thermosetting resin is applicable. As the thermoplastic resin, nylon, polyester, polyethylene, polypropylene, polystyrene, polyphenylene sulfide, ABS and the like can be cited, and as the thermosetting resin, an epoxy resin, an unsaturated polyester resin and the like can be cited. The resin may be used only by itself, or may be used as a fiber-reinforced resin with reinforcing fibers blended therein.

The elastic rings 5, 5 are respectively fixed to legs 4b, 4b of the shell structure 4 and are meant, as well as to support the shell structure 4 by abutting right and left sides of the rim sheet, to prevent the shell sheet 4 from slipping against the rim sheet. A thickness of each of the elastic rings 5, 5 may be around in a range of 5 to 10 mm.

As a material constituting each of the elastic rings 5, 5, rubber and a resin can be used, and in particular, rubber is preferable. As the rubber, natural rubber (NR), isoprene rubber (IR), styrene-butadiene rubber (SBR), butadiene rubber (BR), hydrogenated NBR, hydrogenated SBR, ethylene-propylene rubber (EPDM or EPM), butyl rubber (IIR), acrylic rubber (ACM), chloroprene rubber (CR), silicon rubber, fluoro rubber, and the like can be cited. Needless to say, additives such as a filler, a vulcanizer, a vulcanization accelerator, a softener and an antioxidant can be blended appropriately in the rubber. Here, a desired elasticity can be obtained based on a blend of the rubber compound.

Figure 2:
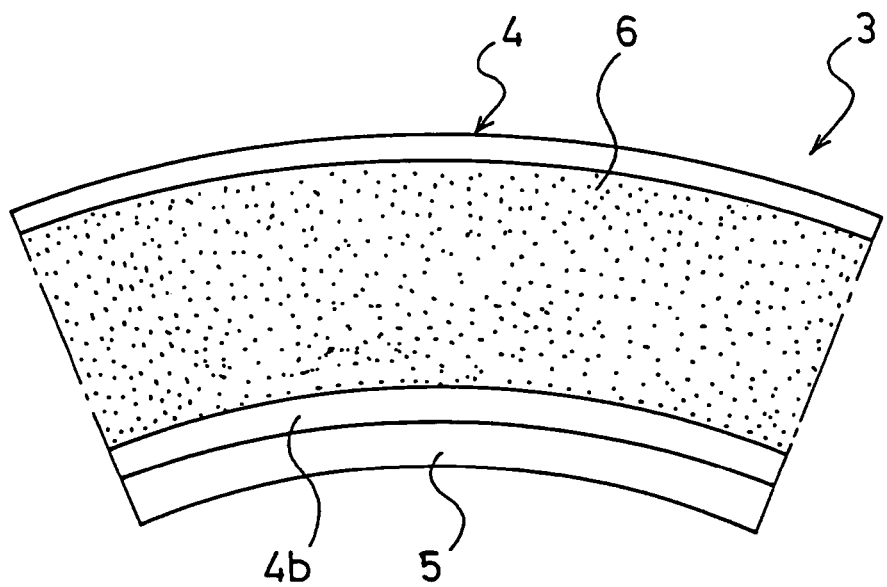
FIG. 2 is a side view showing a main portion of a noise-reducing device in the tire wheel assembly in FIG. 1.

FIG. 2 shows a main portion of the foregoing noise-reducing device. As shown in FIG. 2, on at least part of a surface of the shell structure 4, a rough surface portion 6 is formed. A ten-point height of irregularities (Rz) of the rough surface portion 6 is in a range of 0.1 to 5.0 mm.

By thus forming the rough surface portion 6 having roughness of the appropriate level on the surface of the shell structure 4, sound is allowed to reflect diffusely on the surface of the shell structure 4, and as a result, cavity resonance sound can be reduced. Here, if the ten-point height of irregularities (Rz) of the rough surface portion 6 is out of the above range, a reduction effect on cavity resonance sound becomes insufficient. In particular, it is preferable to have an area of the rough surface portion 6 to be at least 20% of the entire surface area of the shell structure 4, and the ten-point height of irregularities (Rz) of the rough surface area to be in a range of 0.1 to 3.0 mm.

With respect to the rough surface portion 6, although it is possible for it to be worked on the surface of the shell structure 4 by way of press work or to be worked on the surface of the shell structure 4 by way of a shot peening process or a chemical blasting process, it may be formed by spraying particles on the surface of the shell structure 4 by use of paint in which the particles are blended.

In particular, it is the most effective to spray, on the surface of the shell structure 4, hollow particles (microcapsules) each formed of an elastic body such as resin. In this case, it becomes possible to suppress an increase in weight as well as to improve the reduction effect on cavity resonance sound. A diameter of each of the particles may be selected as one in a range of 0.1 to 0.3 mm.

Figure 3:
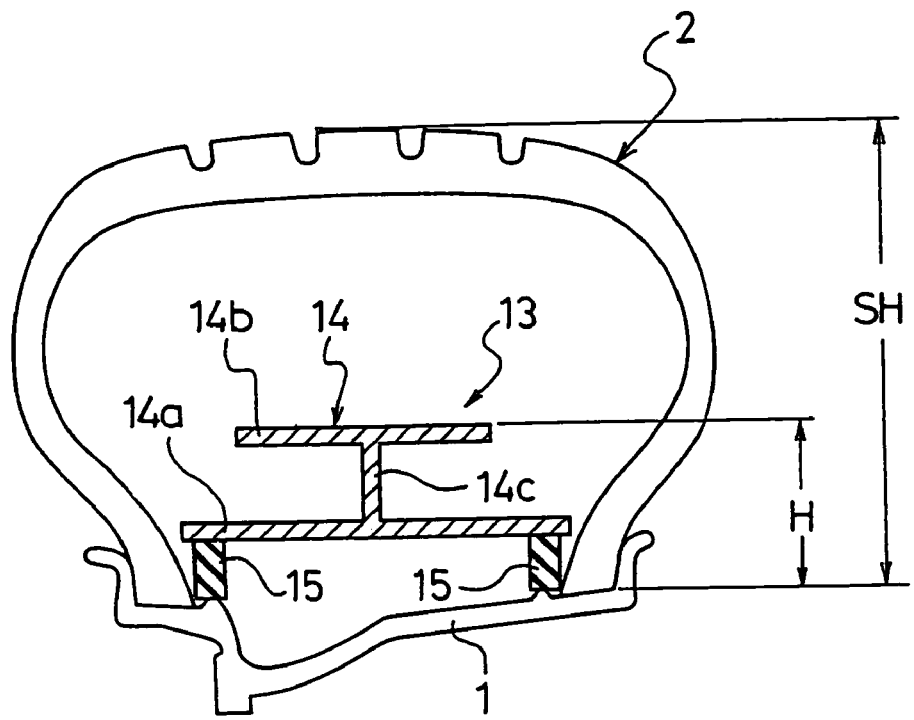
FIG. 3 is a cross-sectional view taken along a meridian of the tire, showing a main portion of a tire wheel assembly configured of a second embodiment of the present invention.

FIG. 3 shows a main portion of a tire wheel assembly (a tired wheel) configured of a second embodiment of the present invention. In FIG. 3, a noise-reducing device 13 is composed of a shell structure 14 and elastic rings 15, and is attached to the wheel rim 1 in the cavity portion of the pneumatic tire 2. This noise-reducing device 13 is formed in a ring shape whose center is an unillustrated rotational axis of the wheel.

The shell structure 14 has an I-shaped cross sectional shape formed in a manner that an inner ring 14a and an outer ring 14b are connected by a connecting plate 14c extending in a radial direction. On the other hand, the elastic rings 15 are fixed to both edges of the inner ring 14a of the shell stricture 14, are meant, as well as to support the shell structure 14 by abutting right and left sides of the rim sheet, to prevent the shell sheet 14 from slipping against the rim sheet. With respect to these shell structure 14 and elastic rings 15, the same measurements and materials as in the case with the above embodiment may be applied.

Figure 4:
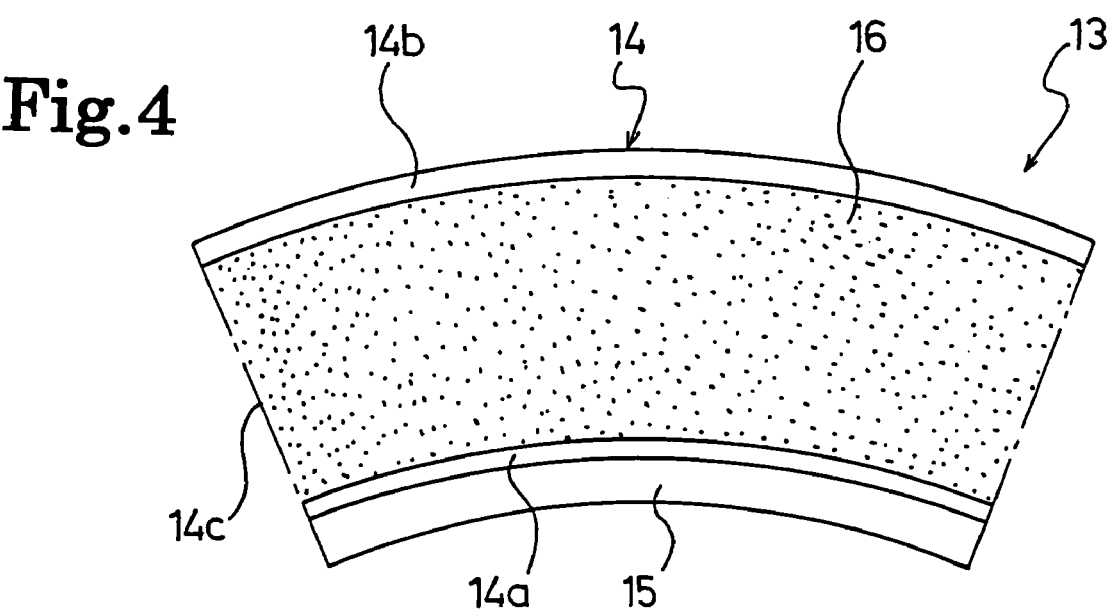
FIG. 4 is a side view showing a main portion of a noise-reducing device in the tire wheel assembly in FIG. 3.

FIG. 4 shows a main portion of the foregoing noise-reducing device. As shown in FIG. 4, on at least part of a surface of the shell structure 14, a rough surface portion 16 having a ten-point height of irregularities (Rz) in a range of 0.1 to 5.0 mm is formed. By thus forming the rough surface portion 16 having roughness of the appropriate level on the surface of the shell structure 14, cavity resonance sound can be reduced.

Figure 5:
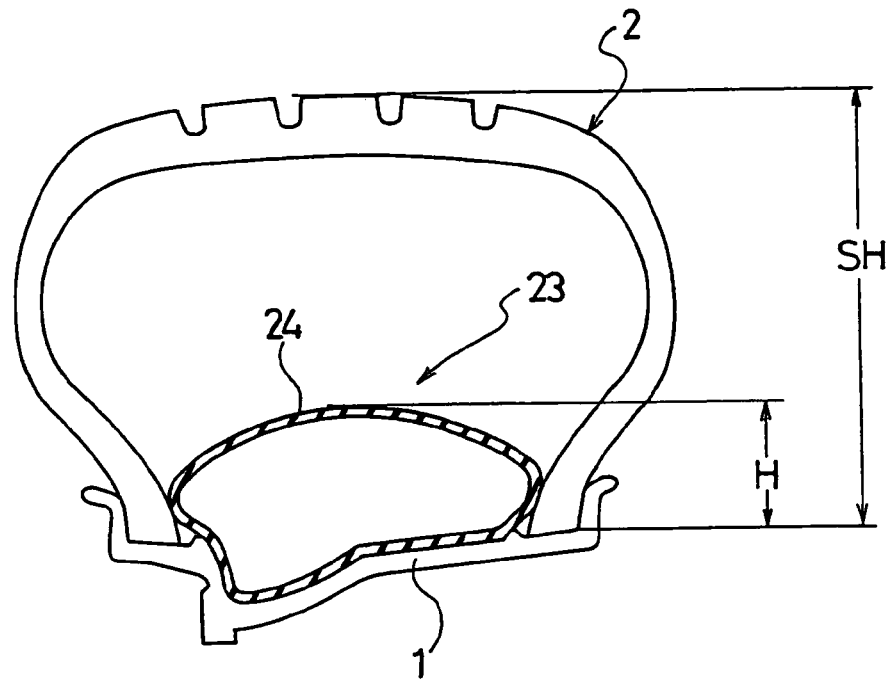
FIG. 5 is a cross-sectional view taken along a meridian of the tire, showing a main portion of a tire wheel assembly configured of a third embodiment of the present invention.

FIG. 5 shows a main portion of a tire wheel assembly (a tired wheel) configured of a third embodiment of the present invention. In FIG. 5, a noise-reducing device 23 is composed of a shell structure 24 which is an annular tube, and is attached to the wheel rim 1 in the cavity portion of the pneumatic tire 2. An inside of the shell structure 24 is filled with air at a predetermined pressure.

As a material constituting the shell structure 24, rubber or the like can be used. As the rubber, natural rubber (NR), isoprene rubber (IR), styrene-butadiene rubber (SBR), butadiene rubber (BR), hydrogenated NBR, hydrogenated SBR, ethylene-propylene rubber (EPDM or EPM), butyl rubber (IIR), acrylic rubber (ACM), chloroprene rubber (CR), silicon rubber, fluoro rubber, and the like can be cited. Needless to say, additives such as a filler, a vulcanizer, a vulcanization accelerator, a softener and an antioxidant can be blended appropriately in the rubber.

Figure 6:
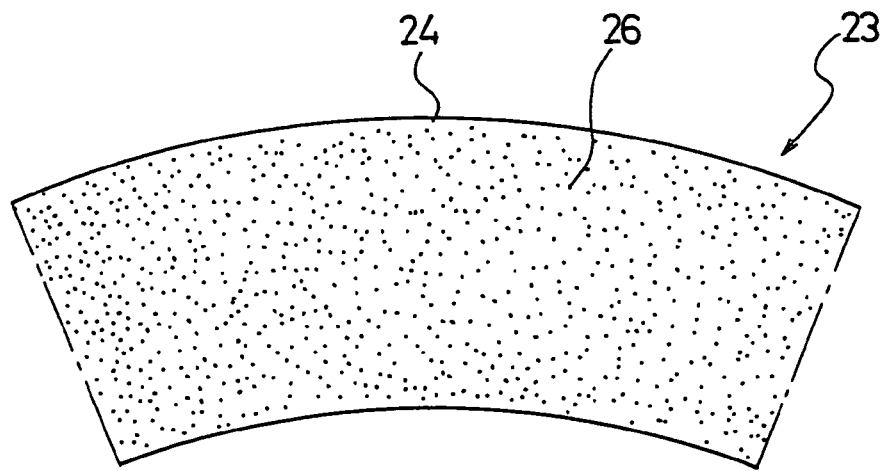
FIG. 6 is a side view showing a main portion of a noise-reducing device in the tire wheel assembly in FIG. 5.

FIG. 6 shows a main portion of the foregoing noise-reducing device. As shown in FIG. 6, on at least part of a surface of the shell structure 24, a rough surface portion 26 having a ten-point height of irregularities (Rz) in a range of 0.1 to 5.0 mm is formed. By thus forming the rough surface portion 26 having roughness of the appropriate level on the surface of the shell structure 24, cavity resonance sound can be reduced.

Figure 7:
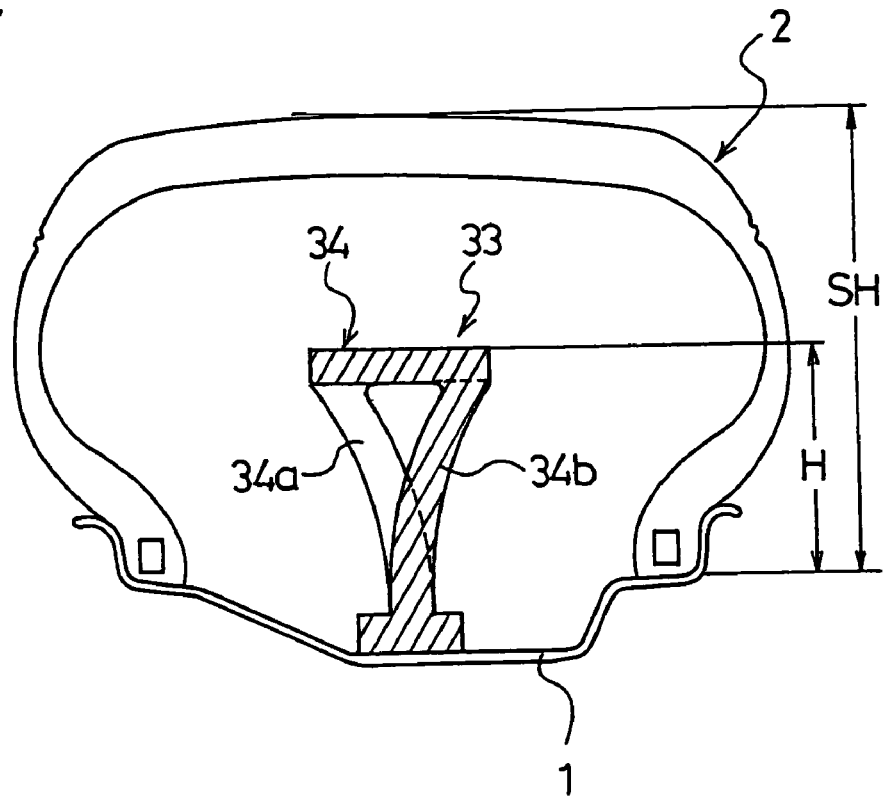
FIG. 7 is a cross-sectional view taken along a meridian of the tire, showing a main portion of a tire wheel assembly configured of a fourth embodiment of the present invention.

FIG. 7 shows a main portion of a tire wheel assembly (a tired wheel) configured of a fourth embodiment of the present invention. In FIG. 7, a noise-reducing device 33 is composed of a shell structure 34 and is attached to the wheel rim 1 in the cavity portion of the pneumatic tire 2. This noise-reducing device 33 is formed in a ring shape whose center is an unillustrated rotational axis of the wheel.

The shell structure 34 includes a plurality of bent pieces 34a each being bent in an L-shape to one direction (to the right in FIG. 7) along a width-wise direction of the tire, and a plurality of bent pieces 34b each being bent in an L-shape to the other direction (to the left in FIG. 7) along the width-wise direction of the tire, and has a structure where these bent pieces 34a and 34b are arranged alternately. As a material constituting the shell structure 34, a metal or a resin can be used.

Figure 8:
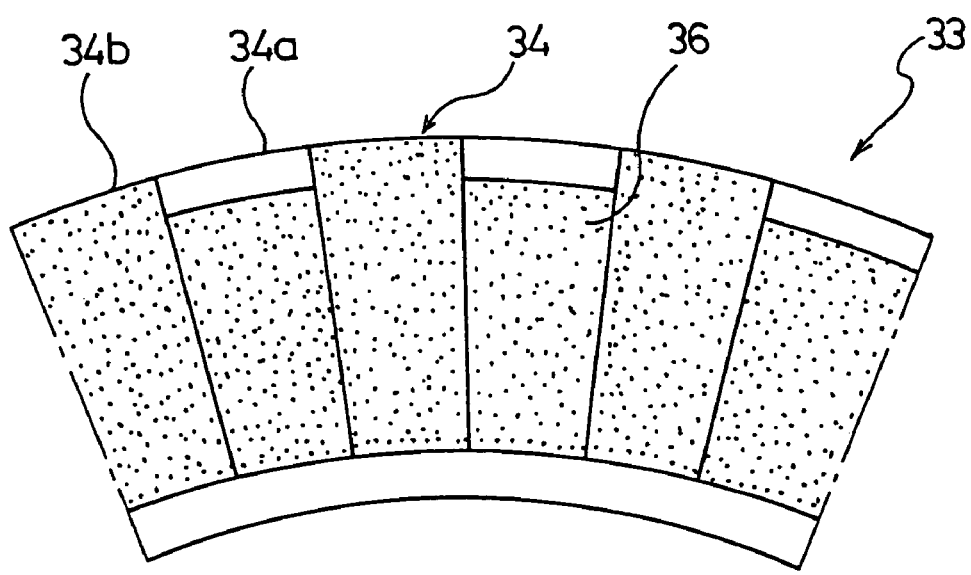
FIG. 8 is a side view showing a main portion of a noise-reducing device in the tire wheel assembly in FIG. 7.

FIG. 8 shows a main portion of the foregoing noise-reducing device. As shown in FIG. 8, on at least part of a surface of the shell structure 34, a rough surface portion 36 having a ten-point height of irregularities (Rz) in a range of 0.1 to 5.0 mm is formed. By thus forming the rough surface portion 36 having roughness of the appropriate level on the surface of the shell structure 34, cavity resonance sound can be reduced.

While the detailed descriptions have been given of the preferred embodiments of the present invention hereinabove, it should be understood that various modifications to, substitutions for, and replacements with the preferred embodiments can be carried out as long as the modifications, the substitutions, and the replacements do not depart from the spirit and the scope of the present invention defined by the attached scope of claims.

EXAMPLES

Each of tire wheel assemblies (Examples 1 to 3) was prepared as a tire wheel assembly of a pneumatic tire, which has a tire size of 205/55R16 89V, and a wheel, which has a rim size of 16×6½JJ, by inserting a noise-reducing device into a cavity portion of the pneumatic tire, the noise-reducing device has been fabricated in a manner that: a steel plate having a thickness of 0.5 mm was worked into a shell structure shown in FIG. 1; a rough surface portion was formed on an outer surface thereof; and elastic rings were fixed respectively to legs of the shell structure. Among these Examples 1 to 3, ten-point heights of irregularities (Rz) and ratios of heights H of the shell structures to cross-sectional heights SH of the respective tires are made variously different.

Additionally, for the purpose of comparison, another tire wheel assembly (Conventional Example) was obtained which had the same structure as Examples 1 to 3 have except that any noise-reducing device was not applied thereto.

For the above four kinds of tire wheel assembly, car interior noise was assessed in the following measuring method, and results of the assessment are shown in Table 1.

Car Interior Noise:

Each of the tire wheel assemblies was inflated with an air pressure of 220 kPa, and then was installed to a passenger automobile having a displacement of 2500 cc. Then, a microphone was installed at a position corresponding to an ear of a driver on a window side in a driver's seat in a car interior of the automobile, and a sound pressure of car interior noise thereof was measured when the automobile was run on a rough road with a speed of 50 km/h. Results of the measurement are represented in index numbers with a figure for the conventional tire being set as 100. A smaller value thereof indicates that the car interior noise is smaller.

TABLE 1

|  | Conventional Example | Example 1 | Example 2 | Example 3 |
| --- | --- | --- | --- | --- |
| Ten-point height of irregularities (Rz) | — | 5.0 | 3.0 | 0.1 |
| Ratio of height of shell structure [(H/SH) × 100%] | — | 30 | 50 | 70 |

TABLE 1-continued

|  | Conventional Example | Example 1 | Example 2 | Example 3 |
| --- | --- | --- | --- | --- |
| Car interior noise (index number) | 100 | 95 | 90 | 98 |

As shown in this Table 1, in each of the tire wheel assemblies of Examples 1 to 3, car interior noise (cavity resonance sound) was reduced.

What is claimed is:

1. A tire wheel assembly,
    wherein a noise-reducing device is attached to a wheel rim in a cavity portion of a pneumatic tire, the noise-reducing device comprising a shell structure where a rough surface portion having a ten-point height of non-linear irregularities (Rz) in a range of 0.1 to 5.0 mm is provided on at least part of a surface, and
    wherein a height of the shell structure from a rim sheet is set in a range of 10 to 70% of a cross-sectional height of the tire,
    wherein the shell structure includes an I-shaped cross-sectional shape defined by an inner ring and an outer ring connected to each other by a radially extending connection plate, and
    wherein the rough surface portion is formed in a manner that particles are fixed on the surface of the shell structure.

2. The tire wheel assembly according to claim 1, wherein the shell structure is supported on a rim through a pair of elastic rings.

3. The tire wheel assembly according to any one of claims 1 or 2, wherein a wall thickness of the shell structure is in a range of 0.4 to 1.0 mm.

4. The tire wheel assembly according to any one of claims 1 or 2,
    wherein an area of the rough surface portion is at least 20% of the entire surface area of the shell structure, and
    wherein the ten-point height of non-linear irregularities (Rz) of the rough surface portion is in a range of 0.1 to 3.0 mm.

5. A tire wheel assembly,
    wherein a noise-reducing device is attached to a wheel rim in a cavity portion of a pneumatic tire, the noise-reducing device comprising a shell structure where a rough surface portion having a ten-point height of irregularities (Rz) in a range of 0.1 to 5.0 mm is provided on at least part of a surface,
    wherein a height of the shell structure from a rim sheet is set in a range of 10 to 70% of a cross-sectional height of the tire, and
    wherein the rough surface portion is formed in a manner that particles are fixed on the surface of the shell structure,
    wherein the shell structure is supported on a rim through a pair of elastic rings.

6. The tire wheel assembly according to claim 5, wherein a diameter of each of the particles is in a range of 0.1 to 3.0 mm.

7. The noise-reducing device according to any one of claims 5 or 6, wherein a wall thickness of the shell structure is in a range of 0.4 to 1.0 mm.

8. The noise-reducing device according to any one of claims 5 or 6,
    wherein an area of the rough surface portion is at least 20% of the entire surface area of the shell structure, and wherein the ten-point height of non-linear irregularities (Rz) of the rough surface portion is in a range of 0.1 to 3.0 rom.

9. The tire wheel assembly according to claim 5, wherein the shell structure has an arch-like cross-sectional shape.

10. A noise-reducing device intended to be attached to a wheel rim in a cavity portion of a pneumatic tire, comprising:
a shell structure where a rough surface portion having a ten-point height of irregularities (Rz) in a range of 0.1 to 5.0 mm is provided on at least part of a surface,
wherein a height of the shell structure from a rim sheet is set in a range of 10 to 70% of a cross-sectional height of the tire, and
wherein the rough surface portion is formed in a manner that particles are fixed on the surface of the shell structure,
wherein the shell structure is supported on a rim through a pair of elastic rings.

11. The noise-reducing device according to claim 10, wherein a diameter of each of the particles is in a range of 0.1 to 3.0 mm.

12. The noise-reducing device according to claim 10, wherein the shell structure has an arch-like cross-sectional shape.

13. A tire wheel assembly,
wherein a noise-reducing device is attached to a wheel rim in a cavity portion of a pneumatic tire, the noise-reducing device comprising a shell structure where a rough surface portion having a ten-point height of irregularities (Rz) in a range of 0.1 to 5.0 mm is provided on at least part of a surface,
wherein a height of the shell structure from a rim sheet is set in a range of 10 to 70% of a cross-sectional height of the tire, and
wherein the rough surface portion is formed in a manner that particles are fixed on the surface of the shell structure,
wherein the shell structure includes a plurality of alternately arranged L-shaped bent pieces.

14. A noise-reducing device intended to be attached to a wheel rim in a cavity portion of a pneumatic tire, comprising:
a shell structure where a rough surface portion having a ten-point height of irregularities (Rz) in a range of 0.1 to 5.0 mm is provided on at least part of a surface,
wherein a height of the shell structure from a rim sheet is set in a range of 10 to 70% of a cross-sectional height of the tire, and
wherein the rough surface portion is formed in a manner that particles are fixed on the surface of the shell structure,
wherein the shell structure includes an I-shaped cross-sectional shape defined by an inner ring and an outer ring connected to each other by a radially extending connection plate.

15. A noise-reducing device intended to be attached to a wheel rim in a cavity portion of a pneumatic tire, comprising:
a shell structure where a rough surface portion having a ten-point height of irregularities (Rz) in a range of 0.1 to 5.0 mm is provided on at least part of a surface,
wherein a height of the shell structure from a rim sheet is set in a range of 10 to 70% of a cross-sectional height of the tire, and
wherein the rough surface portion is formed in a manner that particles are fixed on the surface of the shell structure,
wherein the shell structure includes a plurality of alternately arranged L-shaped bent pieces.

* * * * *